(12) United States Patent
Maher (10) Patent No.: US 7,502,610 B2
(45) Date of Patent: Mar. 10, 2009

(54) SYSTEM AND METHOD FOR APPLICATION MANAGEMENT THROUGH THRESHOLD EVENTS

(75) Inventor: Philip Maher, Campbell, CA (US)

(73) Assignee: QUALCOMM Incorporated, San Diego, CA (US)

(*) Notice: Subject to any disclaimer, the term of this patent is extended or adjusted under 35 U.S.C. 154(b) by 254 days.

(21) Appl. No.: 10/187,067

(22) Filed: Jun. 28, 2002

(65) Prior Publication Data

US 2004/0002326 A1 Jan. 1, 2004

(51) Int. Cl.
*H04M 3/00* (2006.01)

(52) U.S. Cl. ............... 455/419; 455/418; 455/420; 455/412.1; 455/414.1; 455/456.3; 455/405; 463/42; 709/203

(58) Field of Classification Search ......... 455/423–425, 455/422.1, 403, 418–420, 414.1, 412.1, 456.3, 455/517–519; 717/168; 463/29, 39–42, 463/25; 709/203–206, 223; 705/14
See application file for complete search history.

(56) References Cited

U.S. PATENT DOCUMENTS

| | | | | |
|---|---|---|---|---|
| 5,218,631 A | * | 6/1993 | Katz | 463/41 |
| 5,285,494 A | * | 2/1994 | Sprecher et al. | 455/423 |
| 5,618,045 A | * | 4/1997 | Kagan et al. | 463/40 |
| 5,999,808 A | * | 12/1999 | LaDue | 455/412.2 |
| 6,024,640 A | * | 2/2000 | Walker et al. | 463/17 |
| 6,115,680 A | * | 9/2000 | Coffee et al. | 702/187 |
| 6,141,565 A | * | 10/2000 | Feuerstein et al. | 455/560 |
| 6,233,449 B1 | * | 5/2001 | Glitho et al. | 455/423 |
| 6,397,256 B1 | * | 5/2002 | Chan et al. | 709/229 |
| 6,405,034 B1 | * | 6/2002 | Tijerino | 455/414.3 |
| 6,434,398 B1 | * | 8/2002 | Inselberg | 455/517 |
| 6,527,641 B1 | * | 3/2003 | Sinclair et al. | 463/39 |
| 6,561,809 B1 | | 5/2003 | Lynch et al. | |
| 6,585,598 B2 | * | 7/2003 | Nguyen et al. | 463/41 |
| 6,628,939 B2 | * | 9/2003 | Paulsen | 455/414.1 |
| 6,650,892 B1 | * | 11/2003 | Thiriet | 455/419 |
| 6,712,702 B2 | * | 3/2004 | Goldberg et al. | 463/42 |
| 6,735,435 B2 | * | 5/2004 | Newell et al. | 455/419 |
| 6,745,011 B1 | * | 6/2004 | Hendrickson et al. | 455/67.11 |
| 6,760,595 B2 | * | 7/2004 | Inselberg | 455/517 |

(Continued)

FOREIGN PATENT DOCUMENTS

CN 1322429 11/2001

(Continued)

OTHER PUBLICATIONS

Supplementary European Search Report EP03762173, Search Authority The Hague, Nov. 10, 2005.

(Continued)

*Primary Examiner*—Sharad Rampuria
(74) *Attorney, Agent, or Firm*—Fariba Yadegar-Bandari; Robert J. O'Connell; Thomas Rouse (57) ABSTRACT

A system, method, and program for managing applications on remote communication devices, such as cellular telephones, on a wireless communications network. A server on the wireless network stores application threshold event data and manages communication device resident applications through device interaction, such as limiting access to server-side applications, updating the application, or recording the occurrence of the threshold event for other application uses.

33 Claims, 8 Drawing Sheets

U.S. PATENT DOCUMENTS

| | | | |
|---|---|---|---|
| 6,778,820 B2 * | 8/2004 | Tendler | 455/414.2 |
| 6,792,269 B2 * | 9/2004 | Boehmke | 455/424 |
| 6,893,347 B1 * | 5/2005 | Zilliacus et al. | 463/41 |
| 6,939,233 B2 * | 9/2005 | Emmerson | 463/41 |
| 6,947,761 B2 * | 9/2005 | Hutcheson et al. | 455/518 |
| 6,985,721 B1 * | 1/2006 | Khorram | 455/414.1 |
| 6,993,577 B2 * | 1/2006 | Shavit et al. | 709/223 |
| 6,996,444 B2 * | 2/2006 | Ach, III | 700/91 |
| 7,029,394 B2 * | 4/2006 | Leen et al. | 463/16 |
| 7,103,356 B2 * | 9/2006 | Pawlas | 455/419 |
| 2001/0036825 A1 * | 11/2001 | Martin | 455/424 |
| 2002/0095427 A1 * | 7/2002 | Kaplan | 707/102 |
| 2002/0142759 A1 * | 10/2002 | Newell et al. | 455/414 |
| 2003/0087652 A1 * | 5/2003 | Simon et al. | 455/466 |
| 2004/0005926 A1 * | 1/2004 | LeFroy | 463/42 |

FOREIGN PATENT DOCUMENTS

| | | |
|---|---|---|
| EP | 0032410 | 7/1981 |
| EP | 1124368 | 8/2001 |
| EP | 1229701 | 8/2002 |
| JP | 10-240493 | 9/1998 |
| JP | 11-122202 | 4/1999 |
| JP | 11-203127 | 7/1999 |
| JP | 2000-350801 | 12/2000 |
| JP | 2001-27552 | 1/2001 |
| JP | 2001-327749 | 11/2001 |
| JP | 2002-27552 | 2/2002 |
| JP | 2002-177651 | 6/2002 |
| JP | 2004-512767 | 4/2004 |
| RU | 2095112 | 11/1997 |
| RU | 2102790 | 1/1998 |
| RU | 2160970 | 12/2000 |
| WO | 02035769 | 2/2002 |
| WO | WO0211347 | 2/2002 |
| WO | 02017250 | 5/2002 |

OTHER PUBLICATIONS

International Search Report PCT/US03/020390, International Search Authority US, Oct. 6, 2003.

International Preliminary Examination Report PCT/US03/020390, IPEA/US, Mar. 11, 2004.

* cited by examiner

SYSTEM AND METHOD FOR APPLICATION MANAGEMENT THROUGH THRESHOLD EVENTS

BACKGROUND OF THE INVENTION

I. Field of the Invention

This invention generally relates to computer networks and wireless communications. More specifically, the present invention relates to managing remote applications in a wireless communications network where threshold events occur during the execution of the applications.

II. Description of the Related Art

Mobile communications devices, such as the cellular telephones and personal digital assistants, have computer platforms capable of providing more services than simple voice or data communications services. Extant mobile telephones can receive "short messages," such as paging messages, or electronic mails. A mobile telephone can also act as a web browser, enabling users to surf the Internet. The processor of current mobile devices typically manages any resident applications, and the device processor will solely execute the application and not interact with a server or other computer device on the wireless network.

In existing wireless networks, unidirectional communications are common, with an example being a short message downloaded from a server to a mobile device, such as a page or email. These unidirectional communications generally use a limited amount of the expensive bandwidth of the cellular network. Bidirectional communications are then reserved for voice calls between parties on the network.

It is also known to have a multiple user environment and a substantially real-time interaction between personal computer devices on a wire-based LAN or the Internet. Such interaction typically occurs either through, or in selective communication with, a server on the Internet or LAN, and the server can store records of the multiple user interactions for whatever purpose the host desires, such as application management, gathering marketing data, and dissemination of software patches and updates. However, such application interaction and management has been unnecessary and impractical in wireless devices due to the bandwidth constraint and lack of a multi-user interactive environment.

Accordingly, it would be advantageous to provide a system and method that allows remote application management on remote and mobile computer devices in a wireless network. It is thus to the provision of such a system and method that the present invention is primarily directed.

SUMMARY OF THE INVENTION

The present invention is a system, method and program for providing interactive games or applications among multiple users located in different geographical locations, wherein the system manages the applications depending threshold events occurring in the applications. Such threshold events can occur for individual users or a collective group of users in a shared application.

The system includes a server connected to a wireless communications network, and optionally a database accessible by the server. The server communicates with a plurality of wireless communications devices, such as mobile telephones or other hand-held devices, through the wireless communications network. One or more users can start an application by connecting to the server and selecting an application. The server identifies the user through identification information associated with the hand held device and retrieves the appropriate level or access or applications available for the one or more users. The server can also send out an invitation for other users who are identified teammates for the user, or can acquire other users for a multi-user environment if so desired. If the application involves an opponent, the server can send a list of opponents and let the user to choose an opponent. After the user has chosen an opponent, the server can send out an invitation to the opponent and sets up the application between the two parties.

In one embodiment, the server selects applications available to the user according to the user's previous application data, such as score achieved or duration of use of application. The server thus compares the application data to determine if a threshold event has been reached by that user or group of users, and if the threshold event has been reached, the server can alter the application present at the user, provide a different level of access to the user, or otherwise record the event having been reached. A server or other database tracks and stores the application event data for the user or group for a particular remotely used application, thus eliminating the possibility of the threshold data being tampered with by the user.

In another embodiment, the server executes the selected application with display information sent to the screens on each mobile communications device, with each user inputting data from his mobile communications device, and the inputs are transmitted from the mobile device to the server through the wireless communications network. The server takes the inputs and incorporates them into the application. The output from the application is broadcasted by the server to each hand held device for display with the server tracking the events of the multi-user interaction.

In an alternate embodiment, the selected application can be downloaded to each mobile device and executed thereon. In this embodiment, the user enters input and the mobile device executes the input locally and also transmits the application data to a server on the network. In such manner, a server-side user can determine threshold events occurring at a single mobile device.

The system, method, and program therefore provide an advantage in managing applications on the remote mobile devices, and controlling access to server-side application and provide benefits to users through the server-side determination of threshold events. The invention can be used with one or a team of users of a common application on the devices, which is thus scalable to a multi-user application. And because the application data for the mobile device is at least maintained on the server-side, the data is secure from user tampering.

Other objects, advantages, and features of the present invention will become apparent after review of the hereinafter set forth Brief Description of the Drawings, Detailed Description of the Invention, and the claims.

DETAILED DESCRIPTION OF THE INVENTION

In this description, the terms "game" and "application" are used interchangeably; "score" and "threshold event" are used interchangeably; and like numerals refer to like elements throughout the several views. As technologies for third generation (3G) wireless communications mature, more and more service providers are beginning to update the data rate and communication capabilities of wireless networks. With 3G technology, transmission speed can be boosted up to 2.4 million bits per second (mbps) in a fixed environment or 500 kilo bits per second (kbps) in a mobile environment. This increase of the transmission speed provides more bandwidth for mobile communications as well as other mobile applications that can communicate data between other mobile and fixed computer devices across the wireless network.

Mobile communications devices, such as the cellular telephones and personal digital assistants, have computer platforms capable of providing more services than simple voice or data communications services. A 3G mobile telephone can act as a web browser, enabling users to surf the Internet, or connect to servers and download software applications. With higher data rates possible in 3G cellular telephone networks, very rapid unidirectional or bidirectional communication is possible that can allow an interactive computer session with multiple users. Such interactive sessions can include games or other computer applications that require the mobile units to engage in significant data downloading and uploading during application execution.

This increase of bandwidth in the wireless communications network permits interactive applications with graphics display to be played among several users, in addition to providing normal telecommunications services among these users. A wireless communications network 100 shown in FIG. 1 includes a plurality of communication towers 102, each connected to a base station 104 and serving users with communication devices 106. The communication devices 106 can be cellular telephones, pagers, PDAs, laptop computers, or other hand-held, stationary, or portable communication device that uses a wireless and cellular telecommunication network. The commands and data input by each user are transmitted as digital data to a communication tower 102. The communication between a user using a communication device 106 and the communication tower 102 can be based on different technologies, such code division multiplexed access (CDMA), time division multiplexed access (TDMA), frequency division multiplexed access (FDMA), global system for mobile communications (GSM), or other protocols that may be used in a wireless communications network or a data communications network.

Figure 1:
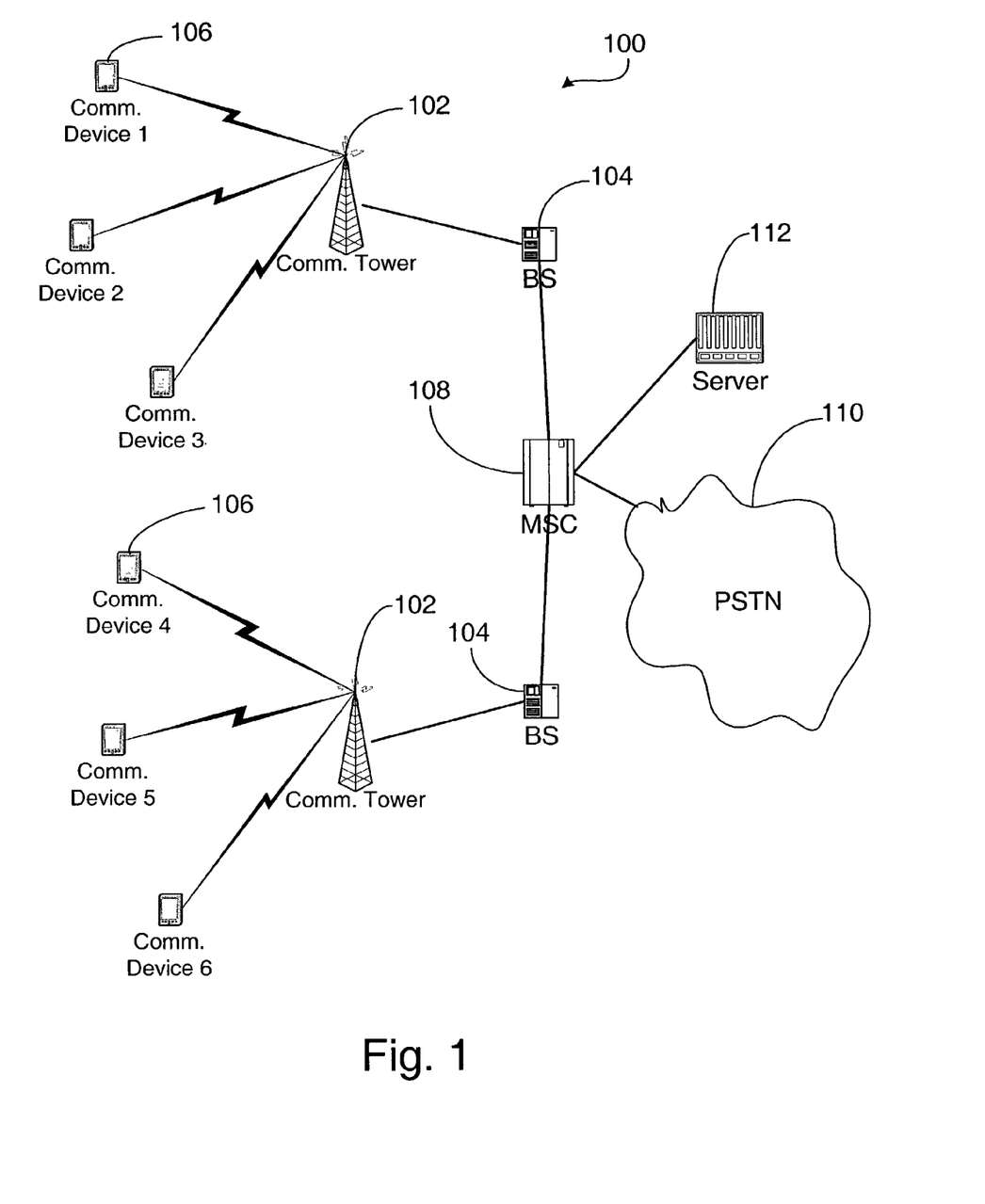
FIG. 1 is an architecture of a wireless communications network.

The data from each user is sent from the communication tower 102 to a base station (BS) 104, and forwarded to a mobile switching center (MSC) 108, which may be connected to a public switched telephone network (PSTN) 110. The MSC 108 sends the data to a server 112 that may connect directly to the MSC 108 or to the PSTN 110.

The server 112 executes an application, which may be a special computer program that analyzes the data and provides a response accordingly. The response can be a graphical display, a command, or a data. The response is broadcasted to one or more users through the wireless communications network 100.

Figure 2:
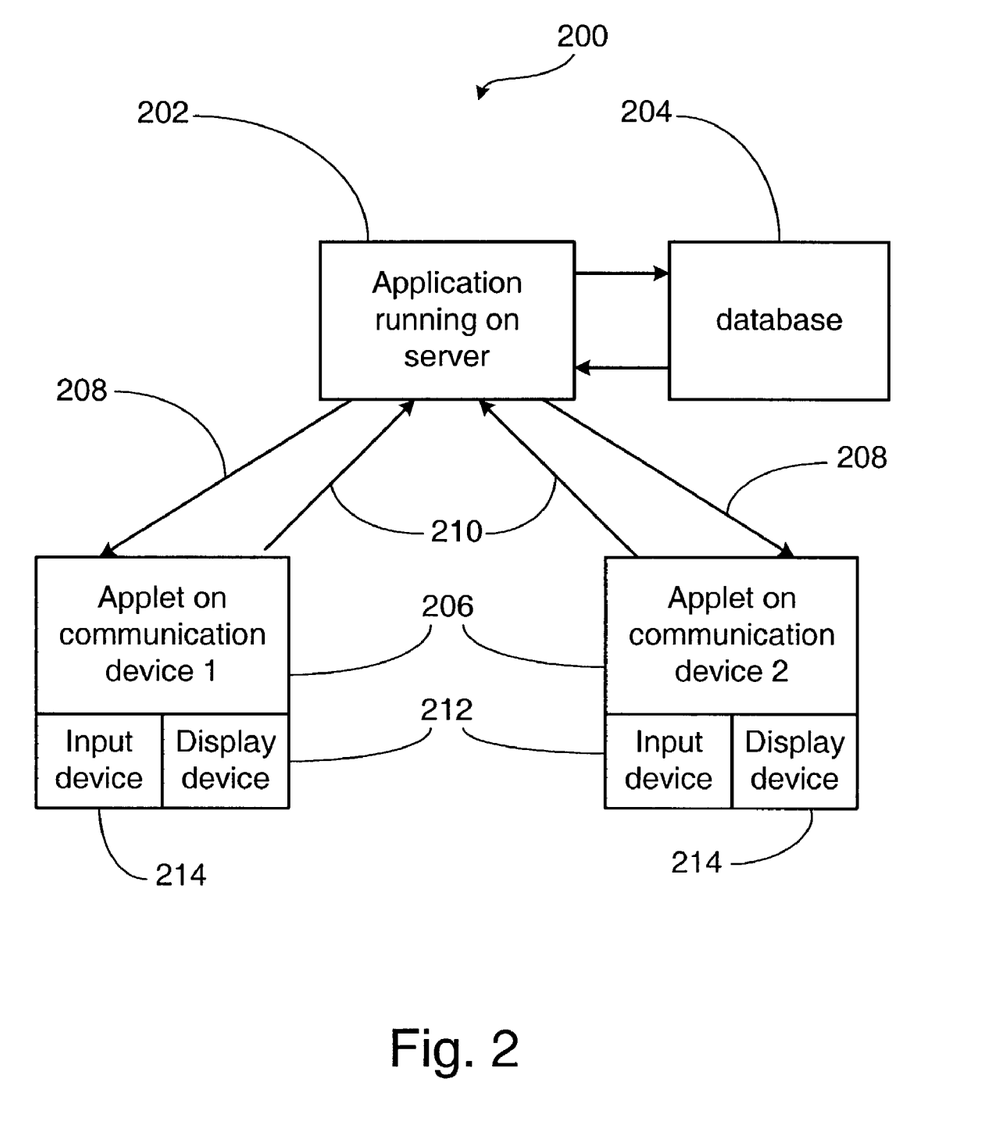
FIG. 2 is a block diagram of one embodiment of an application being managed through threshold events.

The application executed by the server 112 may have an architecture 200 shown in the block diagram of FIG. 2, where the application runs on the server, block 202. The application may access a database, block 204, where application data are stored. The application communicates with applets running on a mobile, communication device, block 206, through download link 208 or upload link 210. The applet receives commands or data from the application and modifies display 212 on the communication device. The applet also receives input from users through input device 214 and uploads the input to the application on the server. The applet can be a simple software application that runs independently on the communication device.

Figure 3:
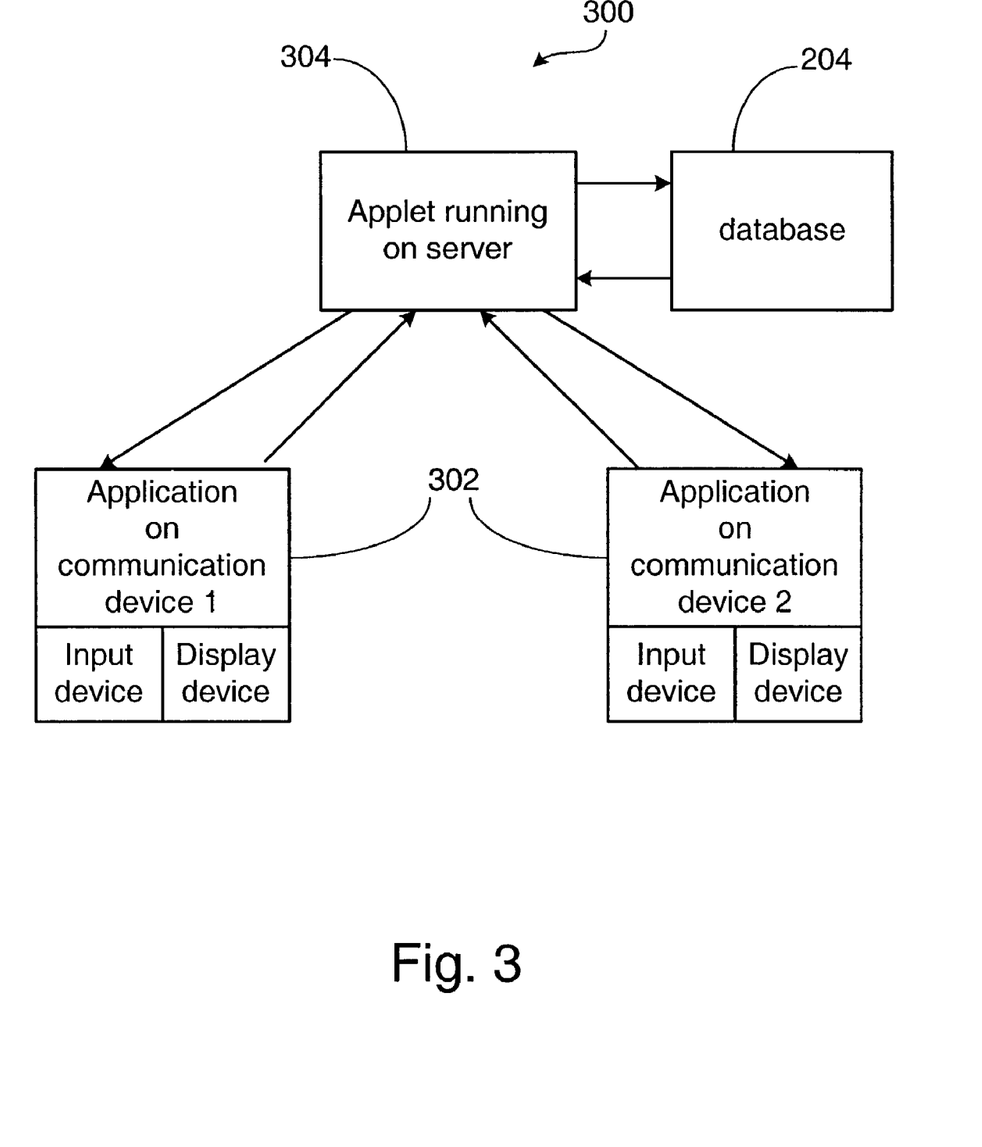
FIG. 3 is a block diagram of an alternate embodiment of an application being managed through threshold events.

An alternate embodiment of the architecture 300 is shown in the block diagram of FIG. 3, where a copy of the application is downloaded to each communication device, block 302, and a simpler applet runs on the server, block 304. In this embodiment, the applet on the server performs a simple task of receiving inputs from each communication device and broadcasting them to all the communication devices 106 running the same application. The input is received by each communication device and executed by the application on the communication device 106. In most instances, each application changes the graphical display on the communication device 106.

The applet on the server, block 304, is also responsible for tracking scores or threshold events and accessing application data on the database, block 204. When a user at communication device 1 scores against the other user at communication device 2, the score or the event is transmitted from the communication device 1 to the server. The applet at the server receives the score, or the event, and broadcasts it to communication device 2. At the end of the application, the applet stores the score or event information in the server-side database 204. By storing scoring information in the database 204, the system prevents possible score tampering by the users. The score or other threshold data, such as duration of application usage or other criteria of application usage, can be stored on the database whereby the network host can provide special serves to the user (s) of the application, such as advanced application availability, contest entry, application updates, or other benefits provided to a user(s) upon the occurrence of a threshold event.

Figure 4:
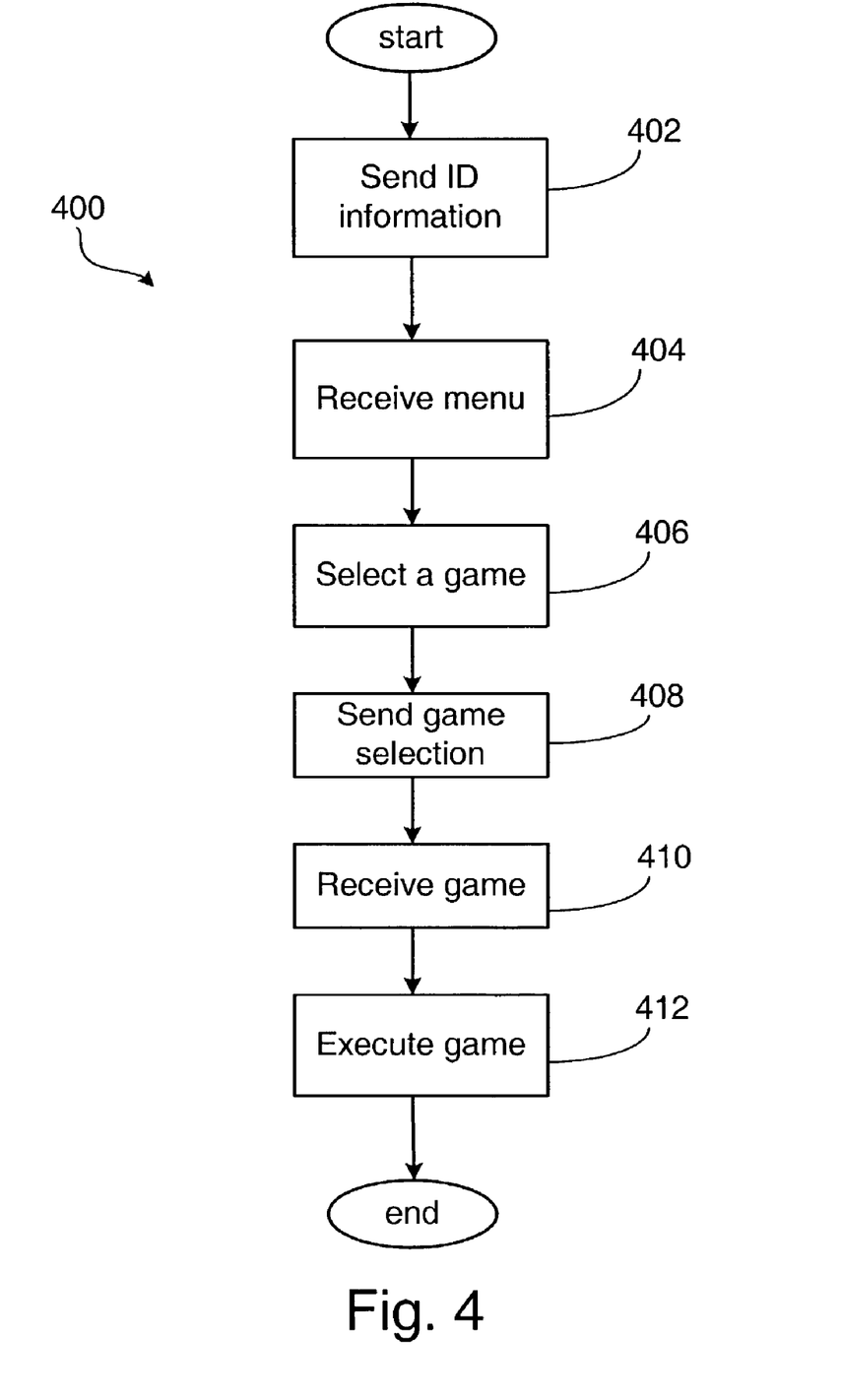
FIG. 4 is a flow chart for one embodiment of a process executing on a mobile device to receive and execute a game application.

FIG. 4 illustrates an exemplary flow chart for a communication device process 400 to play a game that includes changes in the game application availability that occur at threshold events. A user starts the communication device process 400 by activating the communication device 106 and connects to the server 112. The user may connect to the server 112 by dialing a predefined access number assigned to the server 112. The connection between the communication device 106 and the server 112 may also be through a predefined data communications channel and according to a predefined communication protocol. After the communication device 106 is connected to the server 112, the communication device 106 sends the identification information to the server 112, block 402. The identification may be, as way of example, user's identification information, such as the user's initials or a personal identification number (PIN), or the mobile identification number (MIN) assigned to the hand held device, or the electronic serial number (ESN) or the equipment identification number (EID) of the hand held device, or a combination thereof.

After sending the identification information, the communication device 106 receives a menu tailored to the user, block 404, and displays it on a display screen on the communication device 106. The menu received by the communication device can change depending on the user. The menu may be a list of applications available to the user and can include a list of levels. The user's access to more advanced levels depends on the user's past performance at lower levels, and the user's score at a lower level is stored preferably in the database 204. For applications that do not involve prizes or competitions, the user's score may be stored locally at the communication device 106.

The user can select an application from the menu, block 406, and if there are multiple levels for the selected application, the user can also select an application level. However, in a multiple level application, the server 112 may automatically determine the application level. The server 112 determines the application level by retrieving the user's score associated with such application and comparing the score with a score table. The result of the comparison determines the level that the user should play. Thus, if the user achieves a threshold event of duration of play, the advanced game application can be served to the user's communication device 106.

After the user selects the application, the selection is sent to the server 112, block 408, and the server 112 will dispatch the application to the communication device 106 for execution. The communication device 106 receives the application, block 410, and executes the application, block 412. The application execution at the communication device is further explained in FIG. 6. The server 112 can also dispatch an applet associated with the application as discussed above.

Figure 5:
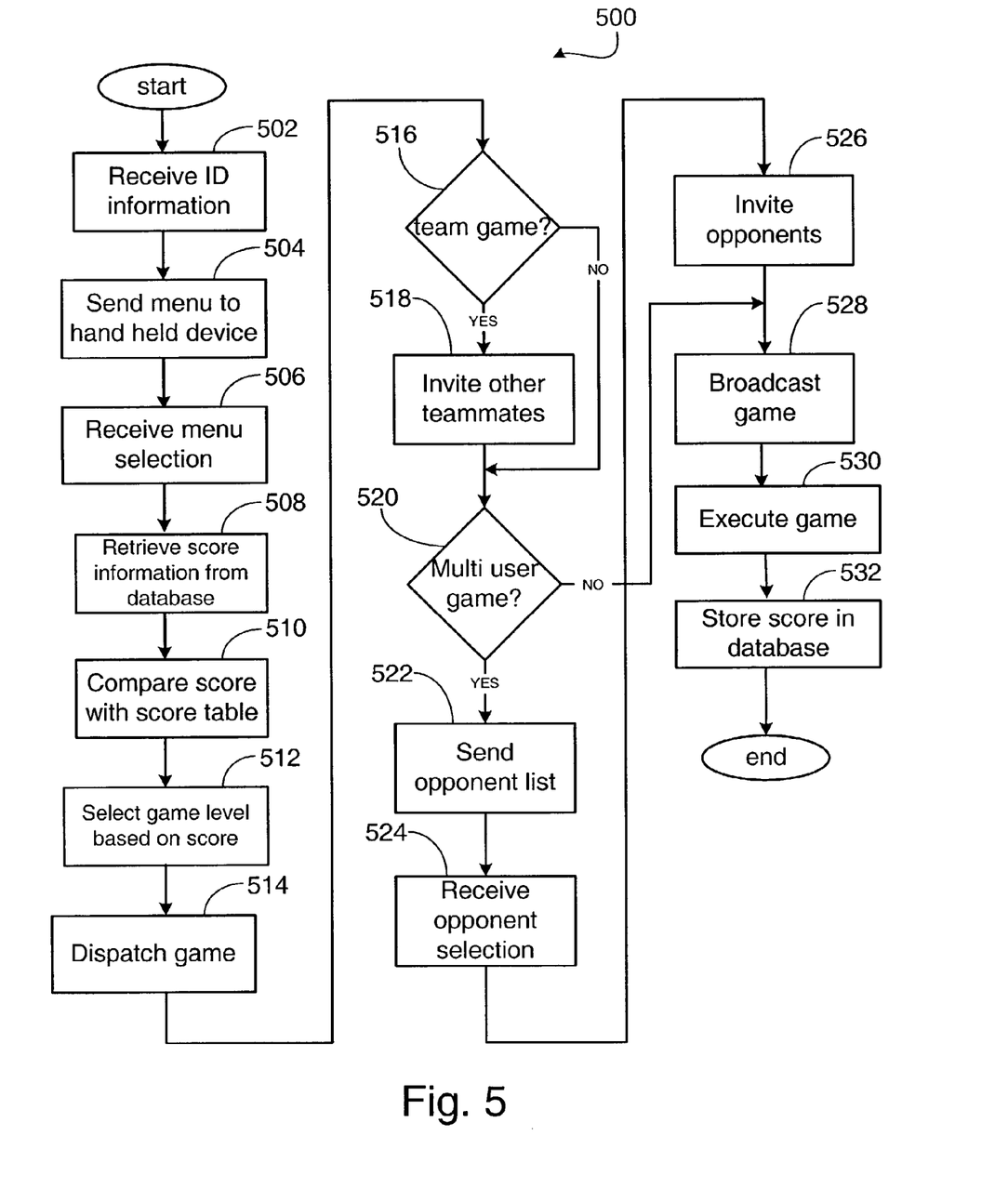
FIG. 5 is a flow chart for another embodiment of the process executing on a server of the wireless network to manage the game application executing on the device of FIG. 4.

FIG. 5 is an exemplary flow chart for a server process 500 to manage the game application executing on the communication device 106. The server 112 receives the identification information from a communication device 106, block 502, and checks it against a user table or a subscriber table. If the user is a subscriber or otherwise authorized user, the server dispatches a menu to the communication device, block 504. If the user is a visitor, the server needs to retrieve his information from his home server before allowing the user to access the system.

After the user makes a selection, the server receives the selection, block 506, and retrieves the user's score from the database, block 508. The score is associated with each application and stored in the database. The server compares the user's score with a score table to determine whether the user is qualified to play the application or to play the application at certain level, block 510. The server then selects an application based on the score, block 512, and dispatches the application to the communication device 106, block 514.

If the application selected is a team application, i.e., involves more than one user and communication device 106, then the server can inquire the user for information about other teammates, and then invites the teammates, block 518. The invitation can occur from locating and sending a message to other communication devices 106 that have indicated they wish to play a team game when members are available. The teammate information may also be stored in the database, and the server can retrieve it from the database before inviting them.

If the application selected is a competition application, i.e., involves opponents, then the server may retrieve an opponent list from the database and send the opponent list to the communication device, block 522. The opponent list can be predefined by all users who have played this application previously or can be predefined by the user. After the user selects the opponent, who may be an individual or a team of several people, the server receives the opponent selection and invites the opponent, block 526.

When the teammates and/or the opponents have accepted the invitation, the server broadcasts the application to each one of them, block 528, and the server executes the application or its applet, block 530. At the end of the application, the server stores the score and application information in the database, block 532.

Figure 6:
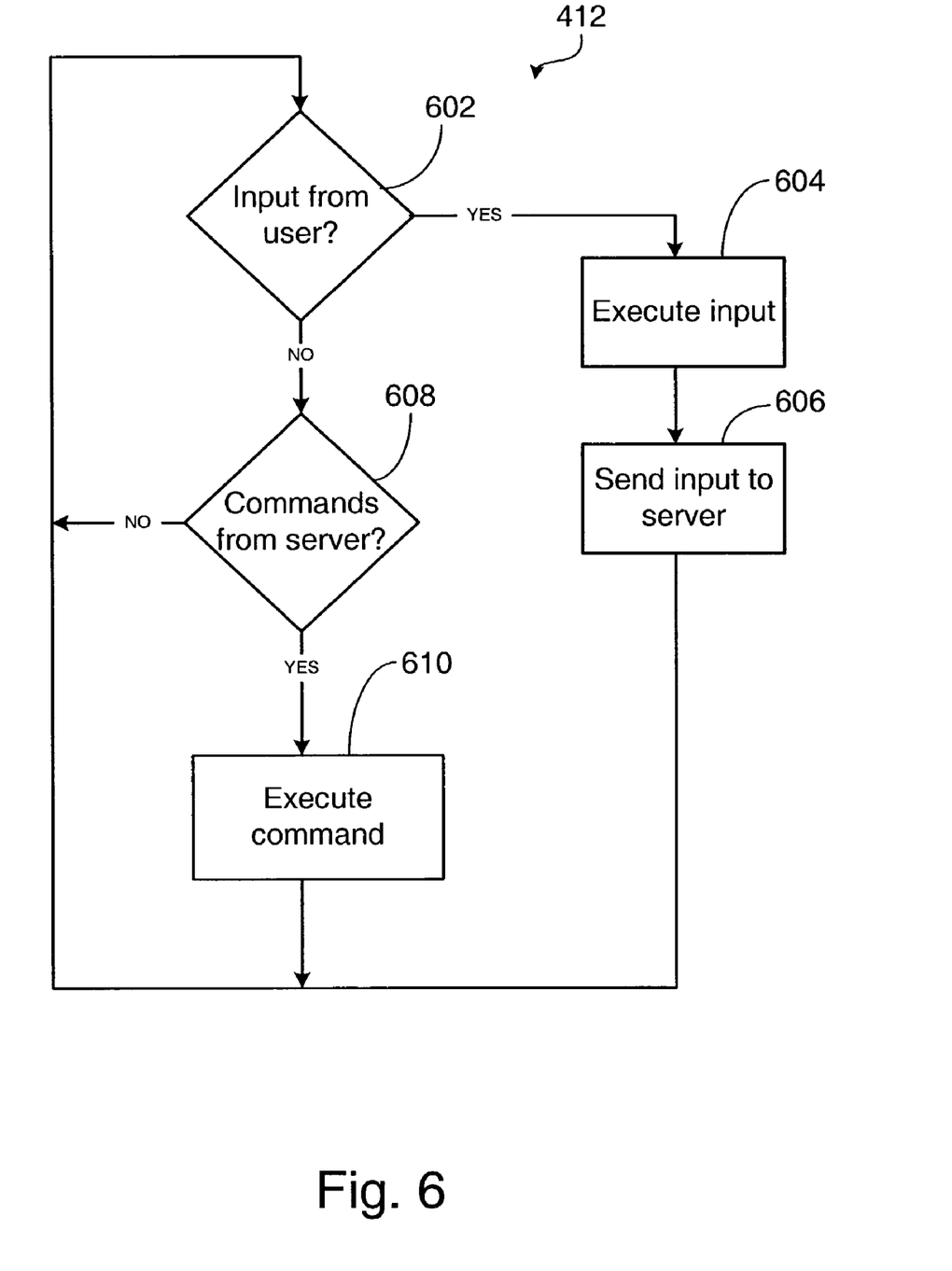
FIG. 6 is a flow chart for the process executing on the mobile device in executing commands during the execution of an application, such as a game.

FIG. 6 is an expansion of block 412 from FIG. 4. While the communication device 106 is executing the application, the communication device 106 checks whether there is an input from the user, block 602. If there is an input from the user, the communication device 106 executes it, block 604, and it also sends the input to the server, block 606. However, if the communication device 106 is executing only an applet of the application, then the communication device 106 may only forward the input to the server and do not execute it locally. The inputs from each user can be sent to the server as part of a data packet that includes the user's identification information.

The communication device 106 also checks for commands from the server, block 608. When commands are received from the server, the communication device 106 executes them, block 610. The execution of commands may include updating screen displays, producing audio effects, or other effects that the communication device 106 is equipped to do. The communication device 106 executes the steps shown in FIG. 6 repeatedly until an input from the user to end the application is received or an ending command is received from the server.

Figure 7:
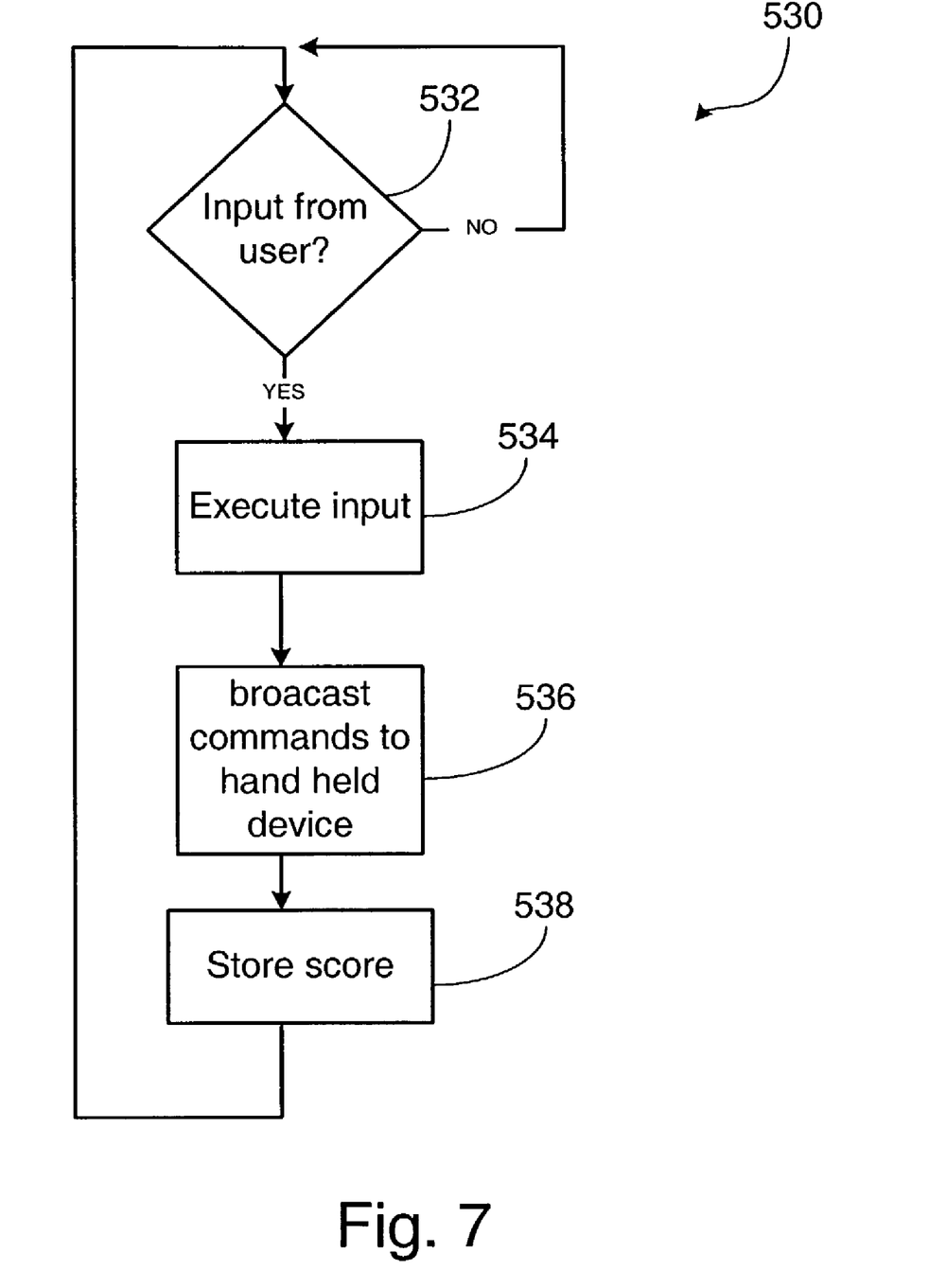
FIG. 7 is a flow chart for the server receiving and executing commands sent from the mobile device in FIG. 6.

FIG. 7 is an expansion of block 530 from FIG. 5. While the server is executing an application, the server checks for input from users, block 532. If an input is received from a user, the server executes the input, block 534, and broadcast resulting commands to all the communication devices 106 connected to the same application, block 536. These commands are used by the communication devices 106 to synchronize with the server. If the server is executing an applet of the application, then the server uses the input to update its state and broadcast the input to all communication devices 106 where the input is executed individually on each communication device.

After the server broadcasts the commands to the communication devices, the server 112 stores the score, block 538, in its internal register. The score is stored to the database when the application is ended. The server 112 executes the steps shown in FIG. 7 repeatedly until the application-ending event is received. The application-ending event may be an input from a user or other criteria as would be known in the art.

In addition to coordinating actions among communication devices 106 and tracking the score or other threshold data, the server 112 may also be responsible for billing. The users may be billed for the access time or per application basis.

Figure 8:
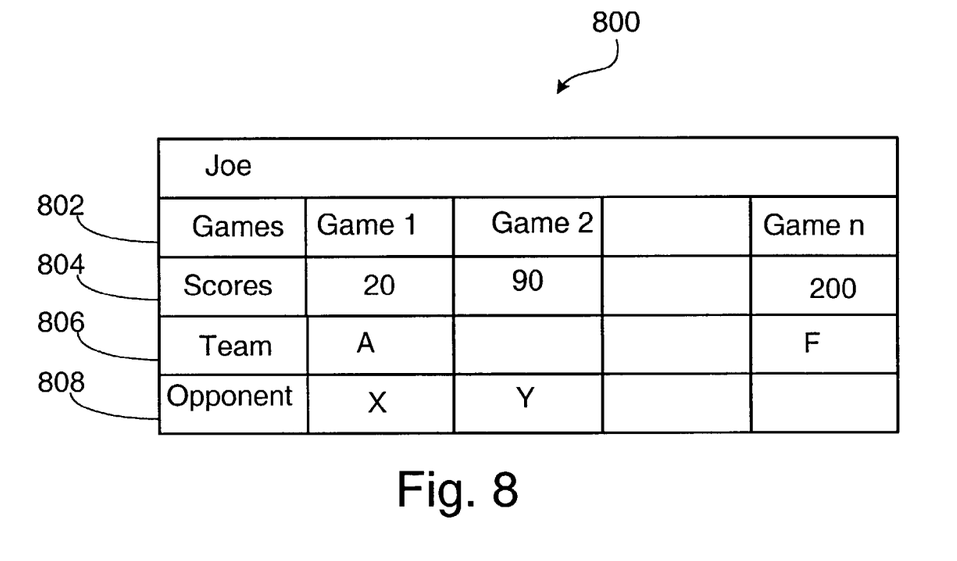
FIG. 8 is an example of application data stored in a server-side database.

FIG. 8 illustrates user application data 800 that can be stored in the database 204. The information about user Joe may include the applications that he subscribes, 802, the scores for each application he subscribes, 804, the team he belongs for each application, 806, and the opponent for each application he subscribes, 808. If an application is not a competition application, then the opponent field is left empty for that application. If the application is not a team application, then the team field is left empty for that application.

The system can thus execute a multiple user competition application, where multiple teams compete against each other. For example, a user may choose to select a basketball game against another team. When the user connects to the server 112, his identification information, such as the ESN of his hand held device, is sent to the server 112. The server 112 validates his identification information against a database to ensure the user has the permission to access its services. As part of validation, the server may also ask the user to enter a PIN.

After making sure that the user has the permission to access its services, the server 112 provides a menu of games for the user to select from. The user selects the basketball game, and the selection is sent to the server. The server 112 checks if the user belongs to a predefined team, and if the user does belong to a team, the server 112 sends invitations to his teammates. The server 112 also checks the previous score obtained by the user's team and selects a list of opponents. The list of opponents is sent to the user, and the user can select one opponent team. After the opponent team is selected, the server 112 sends the invitation to the members of the opponent team.

With all the team members and the opponents in place, the server 112 then broadcasts the game to all the participants. Each communication device 106 receives a copy of the game and executes it locally. The screen display is controlled locally from the output of the game relayed by the server 112.

During the game, inputs from each user is executed locally and also uploaded to the server. After receiving the inputs from a user, the server broadcasts them to all the players in the same game. When the communication devices 106 receive the inputs, each device executes the inputs and updates its screen accordingly. For example, if user 1 inputs a jump shot, his communication device 106 executes the jump shoot and uploads the jump shot with all the supporting information to the server 112. The supporting information may include user's location, angle of jump shot, force of jump shot, etc. The jump shot, with all the supporting information, is received by the server 112 and broadcasted by the server to all the communication devices 106. Each device executes the jump shot and if the jump shot is good, then every communication device shows the jump shot as points to user's team. The server 112 keeps track of the score during the game by receiving information from the communication devices 106. At the end of the game, the server 112 stores the score in the database, and the score will be available next time the user chooses the basketball game.

While the invention has been particularly shown and described with several embodiments thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

The invention claimed is:

1. A system for managing distributed applications comprising:
    a server in communication with a wireless communications network, the server comprising a first portion of an application and a database, wherein the first portion of the application is operable to generate a response, and wherein the database comprises application usage data;
    at least one communication device in selective communication with the server through the wireless communications network, each communication device comprising a second portion of the application operable to selectively execute based on at least one of the response and a user input received on the respective communication device, wherein the second portion of the application is operatively interactive with the first portion of the application during operation of the application by a respective user, wherein each communication device further comprises an output mechanism operable to generate an output which is modifiable based on the execution of the application, and wherein the selective execution of the second portion of the application generates at least a portion of the application usage data; and
    wherein the server is further operable to obtain the application usage data from each communication device, automatically identify at least one of the respective user without requiring the user to sign in to the server and the respective communication device for which the application usage data is generated, determine if a threshold event has occurred based upon the content of the application usage data, and record the occurrence of the threshold event in association with the at least one of the respective user and the respective communication device.

2. The system of claim 1, wherein the first portion of the application and the second portion of the application comprise a multi-user game.

3. The system of claim 1, wherein the communication device comprises a cellular telephone.

4. A system for managing distributed applications on wireless network through the monitoring of threshold events occurring in the application, comprising:
    a server means comprising a first portion of an application and operable for sending and receiving data associated with execution of the application to the wireless network;
    a remote communication means comprising a second portion of the application and operable for selectively sending and receiving data associated with execution of the application across the wireless network, the remote communication means comprising an input means operable to receive a user input responsive to an execution of the application, wherein the first portion of the application and the second portion of the application are interactive during operation of the application by the user, and wherein the remote communication means is further operable to generate application usage data based on at least one of the user input, the execution of the first portion of the application and the execution of the second portion of the application, wherein the application usage data represents a measure of a level of operation by the user of the application; and
    wherein the server means automatically obtains the application usage data from the remote communication means and automatically identifies the user without requiring the user to sign in to the server and the remote communication means associated with the application usage data, determines if a threshold event has occurred at the remote communication means based upon a content of the application usage data, and records any occurrence of the threshold event in association with the user.

5. A method for managing distributed applications resident on a wireless communication device operable on a wireless network, the device in selective communication with at least one server across the network, the method comprising:
    receiving identification information at the server, the identification information identifying the device and the user of the device without requiring the user to sign in to the server;
    retrieving user information using the identification information, the user information comprising application usage data of an application interactively executed by the server and the device based on user inputs to the device in response to application outputs generated on the device;
determining, at the at least one server, an occurrence of a threshold event based upon the application usage data;
interacting with the device based upon the determined threshold event; and
wherein the receiving, the retrieving, the determining and the interacting are performed automatically.

6. The method of claim 5, further comprising the steps of:
receiving the application usage data at the at least one server from the device; and
updating the user information with the received application usage data.

7. The method of claim 5, further comprising recording the threshold event in a separate database on the network.

8. The method of claim 5, wherein interacting further comprises:
selecting the application from a plurality of applications for access by the user according to the user information; and
setting a level of access for the application according to the threshold event in the user information.

9. The method of claim 5, further comprising:
selecting the application from a plurality of applications according to the user information; and
sending the application to the device.

10. The method of claim 5, wherein receiving identification information comprises receiving at least one of a mobile identification number, a personal identification number and an electronic serial identification number.

11. The method of claim 6, wherein receiving the application usage data comprises receiving the application usage data from a game executed on the device.

12. The method of claim 6, wherein receiving the application usage data comprises receiving the application usage data from a multi-user game executed on a plurality of devices.

13. The method of claim 5, wherein the threshold event comprises a score for a game.

14. The method of claim 5, wherein the threshold event comprises a predetermined duration of usage of the application.

15. A method for managing distributed applications resident on a wireless communication device operable on a wireless network, the device in selective communication with at least one server across the network, the method comprising the steps of:
an identification step for automatically identifying at least one of the device and the user of the device without requiring the user to sign in to the server;
a data retrieval step for retrieving user information based on a result of the identification step, the user information comprising server-determined threshold event data associated with application usage data of an application interactively executed by the server and the device, the application usage data based on user inputs to the device in response to application outputs generated on the device; and
an interaction step for interacting with the device from the server, the interaction step based upon the threshold event data.

16. A computer readable medium comprising instructions, that when executed by a machine, directs the machine to manage distributed applications on one or more wireless communication devices, each operable on a wireless network, through performing the actions of:
automatically receiving identification information from a wireless communication device, the identification information identifying a user of the wireless communication device without requiring the user to sign in and the wireless communication device;
retrieving user information using the identification information, the user information comprising application usage data of an application interactively executed by the computer and the device based on user inputs to the device in response to application outputs generated on the device;
determining, at the computer, an occurrence of a threshold event based upon the application usage data;
interacting with the device based upon the determined threshold event; and
wherein the retrieving, the determining and the interacting are performed automatically.

17. The computer readable medium of claim 16, further directing the computer to perform the actions of:
receiving the application usage data from the device; and
updating the user information with the received application usage data.

18. The computer readable medium of claim 16, further directing the computer to perform the action of recording the threshold event in a separate database on the network.

19. The computer readable medium of claim 16, further directing the computer to perform the actions of:
selecting the application from a plurality of applications according to the user information; and
setting a level of access for the application according to the threshold event in the user information.

20. The computer readable medium of claim 16, further directing the computer to perform the actions of:
selecting the application from a plurality of applications according to the user information; and
sending the application to the device.

21. The system of claim 1, wherein the server is further operable to determine if the threshold event has occurred with respect to operation of at least one of the first portion of the application and the second portion of the application based upon the content of the application usage data, and wherein the server is operable to limit access to at least a portion of the application based upon an occurrence of a specific threshold event.

22. The system of claim 21, wherein the threshold event data comprises a score associated with an interactive operation of the application by the user of the at least one communication device.

23. The system of claim 21, wherein the threshold event comprises a predetermined duration of usage of the application by the user of the at least one communication device.

24. The system of claim 1, wherein the at least one communication device comprises a plurality of communication devices, wherein the first portion of the application comprises an applet associated with the second portion of the application, wherein the applet is operable to receive the portion of the application usage data from one of the plurality of communication devices, and wherein the applet is operable to initiate a broadcast of the portion of the application usage data to the other ones of the plurality of communication devices, wherein the portion of the application usage data is operable for execution on the other ones of the plurality of communication devices.

25. The system of claim 1, wherein the server is further operable to determine if the application usage data is associated with a group of users, and wherein the server is further operable to determine the users for the group.

26. The system of claim 1, wherein the second portion of the application comprises an applet associated with the first portion of the application, wherein the applet is operable to forward the user input to the first portion of the application, wherein the first portion of the application is operable to execute the user input to generate the response and at least another portion of the application usage data, and wherein the applet is operable to execute the response to modify the output on the output mechanism.

27. The system of claim 1, wherein the application usage data comprises a threshold event associated with interactive operation of the application by a user of the at least one communication device, and wherein the server is operable to restrict an operational functionality of the application based on the threshold event.

28. The system of claim 27, wherein each communication device comprises identification information, wherein the application usage data corresponds to at least one of the respective identification information, and wherein the server is operable to restrict an operational functionality of the application for the respective communication device based on the threshold event associated with the application usage data and corresponding to the identification information of the respective communication device.

29. The system of claim 28, wherein the identification information comprises at least one of an electronic serial number, a mobile identification number, and a personal identification number.

30. A server, comprising:
a database comprising a plurality of applications and a corresponding plurality of application usage data, each of the plurality of applications having at least a first application portion operable on the server and a second application portion operable on at least one of a plurality of wireless telecommunication devices operable for communication with the server, wherein each of the plurality of application usage data is associated with at least one of the plurality of wireless telecommunication devices, and wherein each of the plurality of application usage data comprises a server-side determination of at least one threshold event determinative of operational access to the respective application; and
wherein each of the plurality of applications is executable by at least one of the server and the plurality of wireless telecommunication devices to present a modifiable output associated with competitive user interaction with the application on each respective wireless telecommunication device, wherein the execution of each of the plurality of applications automatically generates the respective application usage data, wherein the server is operable to identify at least one respective user without requiring the user to sign in to the server and at corresponding wireless telecommunication device, and determine at least one threshold event associated with the application usage data, wherein the at least one threshold event determines a functionality of the respective one of the plurality of applications.

31. The server of claim 30, wherein the server is operable to receive identification information from at least one of the plurality of wireless telecommunication devices, wherein the identification information is associated with at least one of the plurality of applications, and wherein a selected one of the plurality of applications is executable by at least one of the server and the plurality of wireless telecommunication devices based on the identification information.

32. The server of claim 31, wherein the selected application comprises a plurality of executable levels, and wherein a selected one of the plurality of executable levels is based on the application usage data.

33. The device of claim 32, wherein each of the plurality of executable levels is associated with a different threshold event, wherein the server is operable to determine an occurrence of a respective threshold event based on a user input-related output forwarded to the server by the second application portion of at least one of the plurality of wireless telecommunication devices.

* * * * *